(12) United States Patent
Matsuzawa

(10) Patent No.: US 7,110,039 B2
(45) Date of Patent: Sep. 19, 2006

(54) IMAGE PICKUP APPARATUS EMPLOYING SEPARATE FIRST AND SECOND BATTERY STORAGE AREAS

(75) Inventor: Shuichi Matsuzawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 10/314,398

(22) Filed: Dec. 9, 2002

(65) Prior Publication Data

US 2003/0112362 A1    Jun. 19, 2003

(30) Foreign Application Priority Data

Dec. 18, 2001    (JP) .............................. 2001-384735

(51) Int. Cl.
*H04N 5/225* (2006.01)
*G03B 17/02* (2006.01)

(52) U.S. Cl. ...................................... 348/372; 396/539

(58) Field of Classification Search ................ 348/372, 348/374, 376, 371; 396/539, 476; 358/906, 358/909.1

See application file for complete search history.

(56) References Cited

U.S. PATENT DOCUMENTS 3,511,146 A * 5/1970 Finelli et al. ................ 396/539
6,233,016 B1 * 5/2001 Anderson et al. ........... 348/372

FOREIGN PATENT DOCUMENTS

JP    8-186768 A    7/1996
JP    11-8786 A    1/1999

* cited by examiner

*Primary Examiner*—Ngoc-Yen Vu
*Assistant Examiner*—Adam L Henderson
(74) *Attorney, Agent, or Firm*—Fitzpatrick, Cella, Harper & Scinto

(57) ABSTRACT

An image pickup apparatus includes an electronic-flash charging capacitor and first and second battery storage areas separately disposed from each other so as to have the electronic-flash charging capacitor sandwiched therebetween.

17 Claims, 4 Drawing Sheets

IMAGE PICKUP APPARATUS EMPLOYING SEPARATE FIRST AND SECOND BATTERY STORAGE AREAS

BACKGROUND OF THE INVENTION

1. Field of the Invention

The present invention relates to the arrangement of components of an image pickup apparatus for reducing the size thereof by effectively disposing batteries therein.

2. Description of the Related Art

Hitherto, image pickup apparatuses such, as a digital still camera, displaying images captured by image pickup devices or recording the images in recording media have been widely used. In such an image pickup apparatus, a large number of electrical components are used. Among these components, in particular, a plurality of batteries used as a power source occupies a large portion of the space in the image pickup apparatus.

In the known image pickup apparatus, as disclosed, for example, in Japanese Patent Laid-Open Nos. 11-008786 and 8-186768, a plurality of battery storage areas are disposed so as to lie adjacent to each other in a holding portion of the image pickup apparatus.

However, the components of the foregoing known image pickup apparatus are not effectively arranged from the view point of reducing the size of the image pickup apparatus.

Also, since a plurality of main batteries are disposed so as to lie adjacent to each other, there is a risk in that the temperature of the battery storage areas may increase or the battery storage areas may come into contact with a high-voltage component, and there ins a problem in that liquid leak of one of the main batteries may affect to the other batteries.

SUMMARY OF THE INVENTION

It is an object of the present invention to provide an image pickup apparatus which achieves a reduced sized without undermining the original features and functions of the image pickup apparatus and also effectively dissipates heat in the battery storage areas and cools down them by effectively arranging the internal components of the image pickup apparatus.

In accordance with one aspect of the present invention, an image pickup apparatus comprises an electronic-flash charging capacitor and first and second battery storage areas separately disposed from each other so as to have the electronic-flash charging capacitor sandwiched therebetween.

Other aspects, further objects, features and advantages of the present invention will become apparent from the following description of the preferred embodiments with reference to the attached drawings.

DESCRIPTION OF THE PREFERRED EMBODIMENTS

Preferred embodiments of the present invention will be described in detail with reference to the attached drawings.

Figure 1:
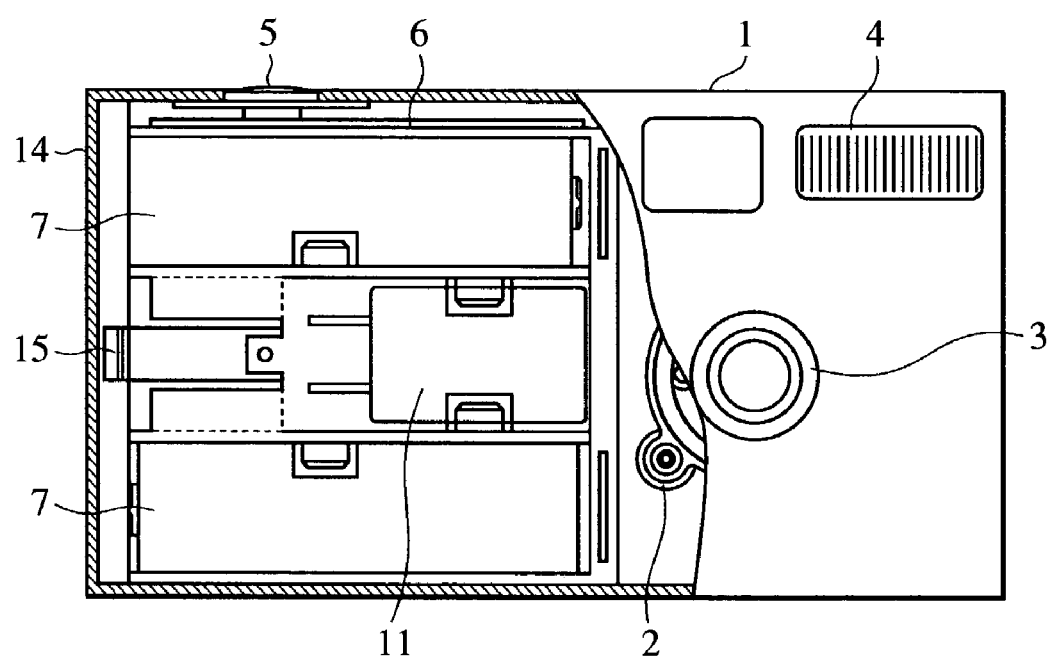
FIG. 1 is a front view of the external appearance and some of the internal components of an image pickup apparatus, illustrating a first example of the arrangement of the components, according to an embodiment of the present invention.
Figure 2:
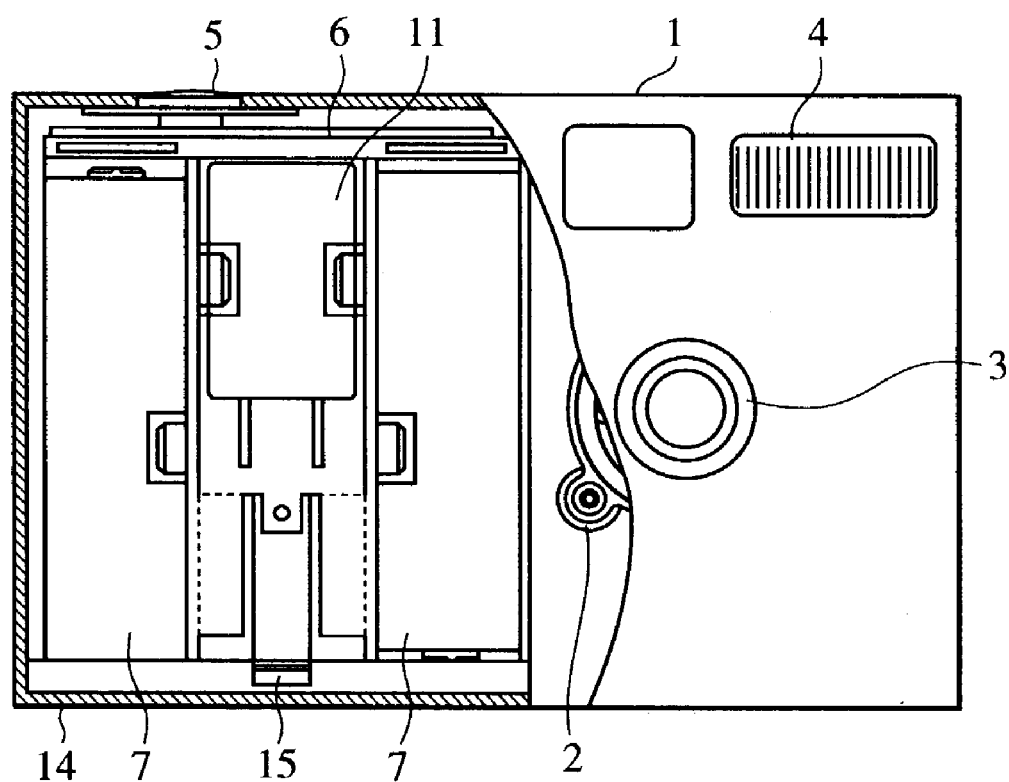
FIG. 2 is a front view of the external appearance and some of the internal components of the image pickup apparatus, illustrating a second example of the arrangement of the components, according to the embodiment of the present invention.
Figure 3:
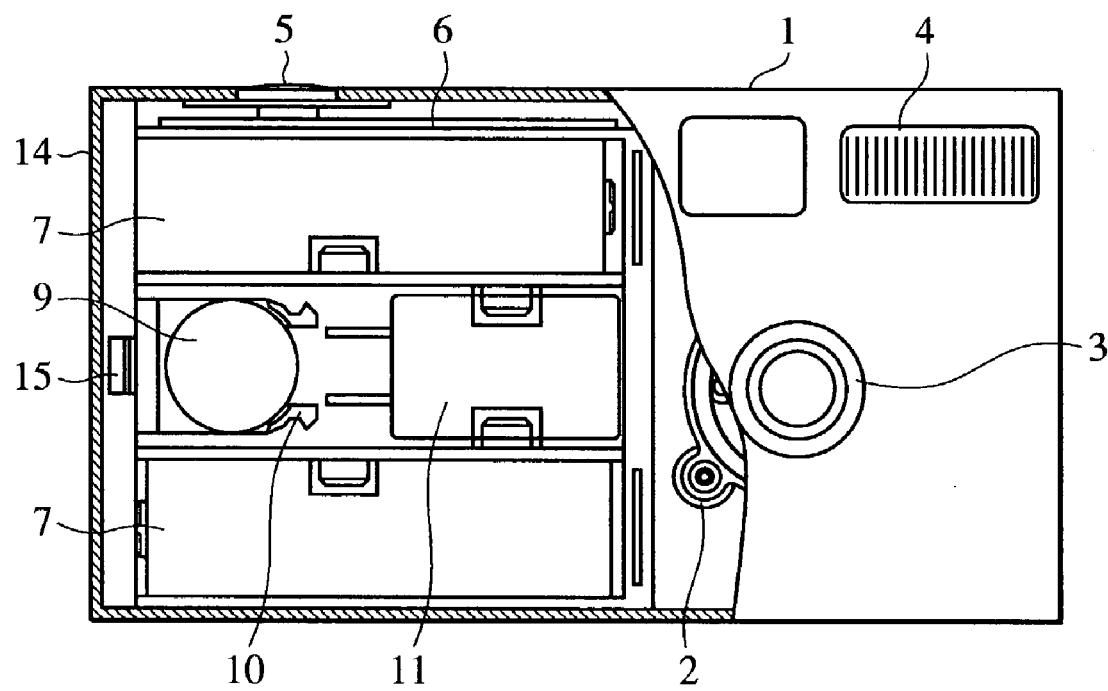
FIG. 3 is a front view of the external appearance and some of the internal components of the image pickup apparatus, illustrating a third example of the arrangement of the components, according to the embodiment of the present invention.
Figure 4:
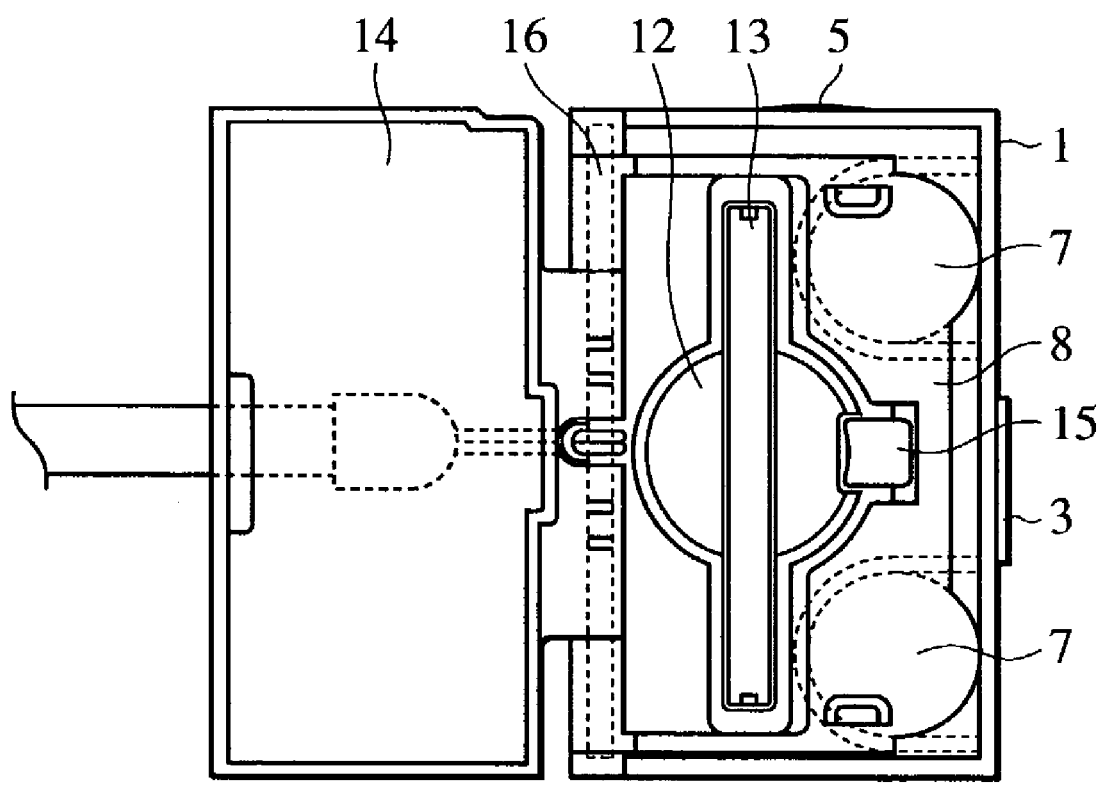
FIG. 4 is a side view of the image pickup apparatus shown in FIG. 1.

FIGS. 1 to 3 are front views, each illustrating the external appearance and some of the internal components of an image pickup apparatus according to an embodiment of the present invention. FIG. 4 is a side view of the image pickup apparatus shown in FIG. 1, illustrating a lid for battery storage areas and a recording-medium loading slot of a recording-medium storage area of the image pickup apparatus according to the embodiment. FIG. 4 illustrates a state in which the lid for the battery storage areas is closed and a lid for protecting a recording medium is open.

In these figures, a main body 1 of the image pickup apparatus has an aperture 3, at the front thereof, for pickup lenses in a lens-barrel 2 of a pickup optical system. Also, the main body 1 has an electronic flash window 4 at the upper right in FIGS. 1 to 3. In addition, the main body 1 has a liquid crystal display (not shown) at the rear thereof used for targeting an object to be shot or playing back a picture image. By operating a shutter button 5, an object to be shot is photographed, and image data of the picture image is transmitted to a recording medium 13 which will be described later. A shutter-button operation board 6 is disposed below the shutter button 5.

The main body 1 also has main batteries 7, which serve as a driving power source for electrical circuits of the image pickup apparatus and which are inserted into or extracted from the battery storage areas when a lid 8 for the battery storage areas is open, and a memory-backup sub-battery 9 held and stored in the main body 1 by a sub-battery holder 10. An electronic flash emits light with an electronic-flash charging capacitor 11. The main body 1 additionally has a loading slot 12 of the recording-medium storage area for loading the recording medium 13, having a round depression so that a user can pinch the recording medium 13 inserted in the recording-medium storage area with his or her fingers and extract it from the storage area. The recording medium 13 for recording an object to be shot which is photographed and applied signal-processing is detachable from the main body 1, is protected by a lid 14, and is inserted into or extracted from the recording-medium storage area when the lid 14 is open. Furthermore, the main body 1 has a locking mechanism 15 (a closed-state holding mechanism) of the lid 8 for the battery storage areas and the lid 14 for protecting the recording medium 13 and has a hinge 16 with which the lids 8 and 14 are turnably connected to the main body 1.

The arrangement of the components of the image pickup apparatus according to the present embodiment will be described.

FIG. 1 is a front view of the external appearance and some of the internal components of the image pickup apparatus according to the embodiment, illustrating a first example of the arrangement of the components. As shown in FIG. 1, in the main body 1 of the image pickup apparatus, the two battery storage areas, each for storing the corresponding main battery 7 and having a substantially hermetically sealed structure, are separately disposed from each other, one directly below the shutter-button operation board 6 disposed close to the top surface of the main body 1 and the other close to the bottom surface of the main body 1, the electronic-flash charging capacitor 11 is disposed while being sandwiched and held by the battery storage areas, and the locking mechanism 15 used for the lid 8 for the battery storage areas and for the lid 14 for protecting the recording medium 13 is disposed in a space formed due to the difference in the total longitudinal length between one of the battery storage areas and the electronic-flash charging capacitor 11.

The locking mechanism 15 maintains the lid 8 for the battery storage areas and the lid 14 for protecting the recording medium 13 in a closed state. The locking mechanism 15 may lock both or either one of the lids 8 and 14.

FIG. 2 is a front view of the external appearance and some of the internal components of the image pickup apparatus according to the embodiment, illustrating a second example of the arrangement of the components. As shown in FIG. 2, in the main body 1 of the image pickup apparatus, the two battery storage areas, each for storing the corresponding main battery 7 and having a substantially hermetically sealed structure, are separately disposed from each other, one directly close to the side surface of the lens-barrel 2 holding a pickup optical system and the other close to the side surface of the main body 1, the electronic-flash charging capacitor 11 is disposed while being sandwiched and held by the battery storage areas, and locking mechanism 15 used for the lid 8 for the battery storage areas and for the lid 14 for protecting the recording medium 13 is disposed in a space formed due to the difference in the total longitudinal length between one of the battery storage areas and the electronic-flash charging capacitor 11.

By arranging the components in the main body 1 as shown in FIG. 1 or FIG. 2, the space in the main body 1 can be effectively used and accordingly the locking mechanism 15 for the lids 8 and 14 can be housed in the main body 1 without increasing the size of the main body 1. Also, this large space improves the versatility of possible design features of the locking mechanism 15 for the lids 8 and 14, and thus a locking mechanism can be provided at a relatively low cost.

In addition, the central space formed between the separately disposed battery storage areas promotes dissipating heat generated by the batteries 7 and cooling down the batteries 7.

FIG. 3 is a front view of the external appearance and some of the internal components of the image pickup apparatus according to the embodiment, illustrating a third example of the arrangement of the components. As shown in FIG. 3, in the main body 1 of the image pickup apparatus, the two battery storage areas, each storing the corresponding main battery 7 and having a substantially hermetically sealed structure, are separately disposed from each other, one directly below the shutter-button operation board 6 disposed close to the top surface of the main body 1 and the other close to the bottom surface of the main body 1, the electronic-flash charging capacitor 11 is disposed while being sandwiched and held by the battery storage areas, and the sub-battery holder 10 holding the memory-backup sub-battery 9 is disposed in a space formed due to the difference in the total longitudinal length between one of the battery storage areas and the electronic-flash charging capacitor 11.

By arranging the components in the main body 1 as shown in FIG. 3, the large space in the main body 1 can be effectively used and accordingly spaces necessary for the components including the memory-backup sub-battery 9 can be sufficiently and reasonably secured without increasing the size of the main body 1, thereby providing a compact image pickup apparatus.

FIG. 4 illustrates the battery lid 8 for the battery storage areas and the recording-medium loading slot 12 of the recording-medium storage area. The two separately disposed battery storage areas for storing the corresponding main batteries 7 have the electronic-flash charging capacitor 11 disposed therebetween and at a back position not visible in the figure. All the longitudinal directions of the battery storage areas and the electronic-flash charging capacitor 11 are arranged so as to be parallel to the front surface of the main body 1. Also, the recording-medium storage area for storing the recording medium 13 having surfaces extending like a plate is disposed next to the rear surfaces of the battery storage areas and the electronic-flash charging capacitor 11 so that the plate-like surfaces of the recording medium 13 extend parallel to a plane formed between the two cylindrical axes of the separately stored main batteries 7 and also to the front surface of the main body 1. In addition, the lids 8 and 14 are disposed so as to open or close slots of the battery storage areas and the recording-medium loading slot 12, respectively, by turning about the hinge 16, and the locking mechanism 15 is disposed in the space between the separately disposed battery storage areas for storing the main batteries 7 so as to maintain the lids 8 and 14 in a closed state.

With this arrangement, the space in the main body 1 can be effectively used and accordingly the locking mechanism for the lids can be housed in the main body 1 without increasing the size of the main body 1.

According to the above-described embodiment, an image pickup apparatus, achieving a reduced size without undermining its original features and functions by effectively arranging the internal components thereof, effectively dissipating heat in its battery storage areas, and thus cooling down them, is provided.

The image pickup apparatus according to the present invention may be formed, as needed, by combining the above described examples or by combining the technical elements of the examples.

Also, the image pickup apparatus may be formed by all or a part of the claims or by all or a part of the components of the examples. In addition, the image pickup apparatus may be combined with another apparatus or serve as a component of another apparatus.

The present invention is applicable to cameras such as an electronic camera for photographing a still image or a moving image by using an image pickup device, a camera using a silver film, a single-lens reflex camera, a lens shutter camera, and a surveillance camera. The present invention is also applicable to an image pickup apparatus other than a camera, an optical apparatus, and another apparatus. In addition, the present invention is applicable to an apparatus applied to the foregoing camera, image pickup apparatus, optical apparatus, and other apparatus, and also to a component serving as a part of one of these apparatuses.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:
an electronic-flash charging capacitor; and
first and second battery storage areas separately disposed from each other so as to have said electronic-flash charging capacitor sandwiched therebetween,
wherein said electronic-flash charging capacitor is held by said first and second battery storage areas, and wherein all of the edges of said electronic-flash charging capacitor are completely sandwiched by said first and second battery storage areas.

2. The image pickup apparatus according to claim 1, further comprising:
an openable and lockable lid configured and positioned to protect said first and second battery storage areas when locked in a closed position; and
a closed-state holding mechanism configured to unlockably lock said lid in its closed position, said closed-state holding mechanism being disposed in a space between said separately disposed first and second battery storage areas.

3. The image pickup apparatus according to claim 2, wherein said closed-state holding mechanism is disposed along the longitudinal direction of said electronic-flash charging capacitor.

4. The image pickup apparatus according to claim 1, further comprising:
a recording-medium storage area for detachably storing a recording medium for recording image data photographed by the image pickup apparatus;
a lid for said recording-medium storage area; and
a closed-state holding mechanism for said lid, disposed in a space between said separately disposed first and second battery storage areas.

5. The image pickup apparatus according to claim 4, wherein said recording-medium storage area is disposed along the longitudinal direction of said electronic-flash charging capacitor.

6. The image pickup apparatus according to claim 1, further comprising another battery storage area for storing a backup battery, disposed in a space between said separately disposed first and second battery storage areas.

7. The image pickup apparatus according to claim 6, wherein said battery storage area for storing a backup battery is disposed along the longitudinal direction of said electronic-flash charging capacitor.

8. The image pickup apparatus according to claim 1, further comprising a recording-medium storage area for detachably storing a recording medium for recording image data photographed by the image pickup apparatus, wherein said recording-medium storage area stores the recording medium having surfaces extending like a plate such that the plate-like surfaces extend parallel to a plane formed between axes of two cylindrical batteries separately stored in said first and second battery storage areas.

9. The image pickup apparatus according to claim 1, further comprising a recording-medium storage area which detachably stores a recording medium for recording image data photographed by the image pickup apparatus and which is disposed in the vicinity of said first and second battery storage areas, wherein said recording-medium storage area stores the recording medium having surfaces extending like a plate such that the plate-like surfaces extend parallel to a plane formed between axes of two cylindrical batteries separately stored in said first and second battery storage areas.

10. An image pickup apparatus comprising:
a recording medium;
an openable and lockable recording-medium lid configured and positioned to protect said recording medium when locked in a closed position;
first and second battery storage areas separately disposed from each other;
an openable and lockable battery-storage-area lid configured and positioned to protect said first and second battery storage areas when locked in a closed position; and
a closed-state holding mechanism configured to lock said recording medium lid, said closed-state holding mechanism being disposed in a space between said separately disposed first and second battery storage areas.

11. The image pickup apparatus according to claim 10, further comprising a recording-medium storage area for detachably storing a recording medium for recording image data photographed by the image pickup apparatus, wherein said recording-medium storage area stores the recording medium having surfaces extending like a plate such that the plate-like surfaces extend parallel to a plane formed between axes of two cylindrical batteries separately stored in said first and second battery storage areas.

12. A camera comprising:
an electronic-flash charging capacitor; and
first and second battery storage areas separately disposed from each other so as to have said electronic-flash charging capacitor sandwiched therebetween,
wherein said electronic-flash charging capacitor is held by said first and second battery storage areas, and
wherein all of the edges of said electronic-flash charging capacitor are completely sandwiched by said first and second battery storage areas.

13. The camera according to claim 12, further comprising:
an openable and lockable lid configured and positioned to protect said first and second battery storage areas when locked in a closed position; and
a closed-state holding mechanism configured to unlockably lock said lid in its closed position, said closed-state holding mechanism being disposed in a space between said separately disposed first and second battery storage areas.

14. The camera according to claim 13, wherein said closed-state holding mechanism is disposed along the longitudinal direction of said electronic-flash charging capacitor.

15. The camera according to claim 12, further comprising another battery storage area for storing a backup battery, disposed in a space between said separately disposed first and second battery storage areas.

16. The camera according to claim 12, wherein said battery storage area for storing a backup battery is disposed along the longitudinal direction of said electronic-flash charging capacitor.

17. A camera comprising:
a recording medium;
an openable and lockable recording-medium lid configured and positioned to protect said recording medium when locked in a closed position;
first and second battery storage areas separately disposed from each other;
an openable and lockable battery-storage-area lid configured and positioned to protect said first and second battery storage areas when locked in a closed position; and
a closed-state holding mechanism configured to lock said recording medium lid, said closed-state holding mechanism being disposed in a space between said separately disposed first and second battery storage areas.

* * * * *